(12) United States Patent
Choi et al.

(10) Patent No.: US 12,025,215 B2
(45) Date of Patent: Jul. 2, 2024

(54) TRANSMISSION WITH STRUCTURE FOR PREVENTING ROTATION OF SNAP RING

(71) Applicant: NEOOTO CO., LTD., Seoul (KR)

(72) Inventors: Duk Soon Choi, Chungcheongnam-do (KR); Yun Sik Jeong, Chungcheongnam-do (KR); Sun Hyun Kim, Seoul (KR)

(73) Assignee: NEOOTO CO., LTD., Seoul (KR)

( * ) Notice: Subject to any disclaimer, the term of this patent is extended or adjusted under 35 U.S.C. 154(b) by 0 days.

(21) Appl. No.: 17/897,236

(22) Filed: Aug. 29, 2022

(65) Prior Publication Data

US 2023/0062494 A1 Mar. 2, 2023

(30) Foreign Application Priority Data

Aug. 30, 2021 (KR) .................. 10-2021-0115029

(51) Int. Cl.
*F16H 57/02* (2012.01)
*F16H 57/021* (2012.01)
*F16H 57/023* (2012.01)

(52) U.S. Cl.
CPC ......... *F16H 57/023* (2013.01); *F16H 57/021* (2013.01)

(58) Field of Classification Search
CPC .............. F16H 57/023; F16H 57/021; F16H 2057/0325; F16H 57/037; F16H 57/028
See application file for complete search history.

(56) References Cited

U.S. PATENT DOCUMENTS

| 1,953,113 | A | * | 4/1934 | Lapsley | F16H 3/08 384/420 |
| 3,949,459 | A | * | 4/1976 | Marenchin | B25B 27/304 29/256 |
| 4,793,200 | A | * | 12/1988 | McDonald | F16H 57/021 74/411 |
| 2001/0012808 | A1 | * | 8/2001 | Tajima | F16H 57/10 475/331 |
| 2013/0014363 | A1 | * | 1/2013 | Filiatrault | B23B 39/10 74/405 |
| 2016/0164384 | A1 | * | 6/2016 | Johnson | F16C 19/30 310/85 |
| 2018/0223957 | A1 | * | 8/2018 | Yoo | F16H 1/22 |
| 2018/0372207 | A1 | * | 12/2018 | Baker, Jr. | F16H 57/021 |

(Continued)

FOREIGN PATENT DOCUMENTS

| CN | 113366187 A | * | 9/2021 | ............ E05F 15/697 |
| CN | 113389877 A | * | 9/2021 | ........... F16H 19/001 |

(Continued)

*Primary Examiner* — Zakaria Elahmadi
(74) *Attorney, Agent, or Firm* — JCIPRNET

(57) ABSTRACT

The transmission having a structure preventing snap ring rotation includes a first driver including an input shaft configured to receive power from the outside, a second driver arranged apart from the first driver, optionally connected to the first driver, and including an output shaft configured to output power, a third driver arranged between the first driver and the second driver and having one end to which a support bearing is coupled, and a case including a first insertion hole into which the first driver is inserted, a second insertion hole into which the second driver is inserted, a third insertion hole into which the third driver is inserted.

4 Claims, 6 Drawing Sheets

(56) References Cited

U.S. PATENT DOCUMENTS

2021/0162861 A1\* 6/2021 Jackson ................ F16H 57/02
2022/0260153 A1\* 8/2022 Lutz .................... F16H 57/0452

FOREIGN PATENT DOCUMENTS

| DE | 102017117215 | \* | 7/2017 | ........... F16H 57/023 |
| DE | 102017117215 A1 | \* | 1/2019 | |
| JP | 2004068850 | | 3/2004 | |
| KR | 20070107388 | | 11/2007 | |
| KR | 100812462 | | 3/2008 | |
| WO | WO-2006105809 A1 | \* | 10/2006 | ........... F16H 57/021 |
| WO | WO-2017047911 A1 | \* | 3/2017 | ............. F16D 41/00 |
| WO | WO-2018121420 A1 | \* | 7/2018 | ............... B60K 1/02 |

\* cited by examiner

TRANSMISSION WITH STRUCTURE FOR PREVENTING ROTATION OF SNAP RING

FIELD OF THE INVENTION

The disclosure relates to a transmission, and more particularly to, a transmission having a structure preventing snap ring rotation.

PRIOR ART

A snap ring is arranged on a shaft or in a hole such that a rotation member such as a bearing does not deviate from a designated position. In transmissions of the related art, a case does not have a separate structure preventing snap ring rotation, or after a hole is machined in a case and a spring pin is assembled, rotation is prevented by assembling the spring pin into a groove or the like inserted into a snap ring.

When a case does not have a structure preventing snap ring rotation, it is difficult to disassemble a snap ring because the snap ring rotates or deviates from a designated position during the operation of a transmission. Also, in the process of disassembling the snap ring, there is a risk of damage to the snap ring or other parts of the transmission.

When a spring pin is used, a snap ring may be disassembled relatively easily, but a separate structure (such as a configuration for assembling the spring pin in a case and a structure preventing deviation of the snap ring) should be formed so that the spring pin does not deviate. Accordingly, even when the number of parts included in a transmission increases, it takes a lot of time and expenses to process a case.

The background art as described above is technological information that the inventor has kept to derive the disclosure or has acquired in the process of deriving the disclosure, and is not necessarily considered to be known technology disclosed prior to the filing of the disclosure.

DOCUMENT OF RELATED ART (Patent Document 1) Korean Public Patent Notification KR 10-0812462 B1

DISCLOSURE OF THE INVENTION

Technical Goal of the Invention

To solve the above-described problems, provided is a transmission in which a structure preventing rotation of a snap ring is formed on one side of a transmission case, and thus, even with a simple configuration, a position of the snap ring may be maintained during the operation of the transmission, and the snap ring may be easily disassembled.

However, the above technical features are exemplary, and scope of the disclosure is not limited thereto.

Means for Achieving Technical Goal

A transmission having a structure preventing snap ring rotation according to an embodiment includes a first driver including an input shaft configured to receive power from the outside, a second driver arranged apart from the first driver, optionally connected to the first driver, and including an output shaft configured to output power, a third driver arranged between the first driver and the second driver and having one end to which a support bearing is coupled, and a case including a first insertion hole into which the first driver is inserted, a second insertion hole into which the second driver is inserted, a third insertion hole into which the third driver is inserted and having a snap ring arranged therein to surround at least a portion of an outer surface of the support bearing, and a stopper formed between and in correspondence with both ends of the snap ring.

In the transmission having the structure preventing snap ring rotation according to an embodiment, the third insertion hole may include a rib protruding along at least a portion of a circumference thereof and an open area in which the rib is not formed, and the stopper may be arranged in the open area.

In the transmission having the structure preventing snap ring rotation according to an embodiment, the both ends of the snap ring may be arranged apart from both surfaces of the stopper by a certain distance in the open area.

In the transmission having the structure preventing snap ring rotation according to an embodiment, the third insertion hole may include a first insertion groove arranged in an inner circumferential surface thereof and into which the snap ring is inserted, and the support bearing may include a second insertion groove arranged in an outer circumferential surface thereof and into which the snap ring is inserted.

In the transmission having the structure preventing snap ring rotation according to an embodiment, the stopper may have an inner end portion arranged closer to an outer circumference of the snap ring than to an inner circumference of the snap ring.

In the transmission having the structure preventing snap ring rotation according to an embodiment, the stopper may be arranged only inside the open area.

These and/or other aspects will become apparent and more readily appreciated from the following detailed description of the embodiments, the accompanying drawings, and claims.

Effect of the Invention

A transmission having a structure preventing snap ring rotation according to an embodiment may prevent a snap ring from deviating a designated position with a simple configuration and may allow the snap ring to be easily disassembled from the transmission.

A transmission having a structure preventing snap ring rotation according to an embodiment is easy to disassemble and thus has excellent assemblability, has a simple structure and thus has excellent structural stability, and may have reduced number of parts and thus may achieve weight reduction and cost reduction.

DESCRIPTION OF EMBODIMENT

Figure 1:
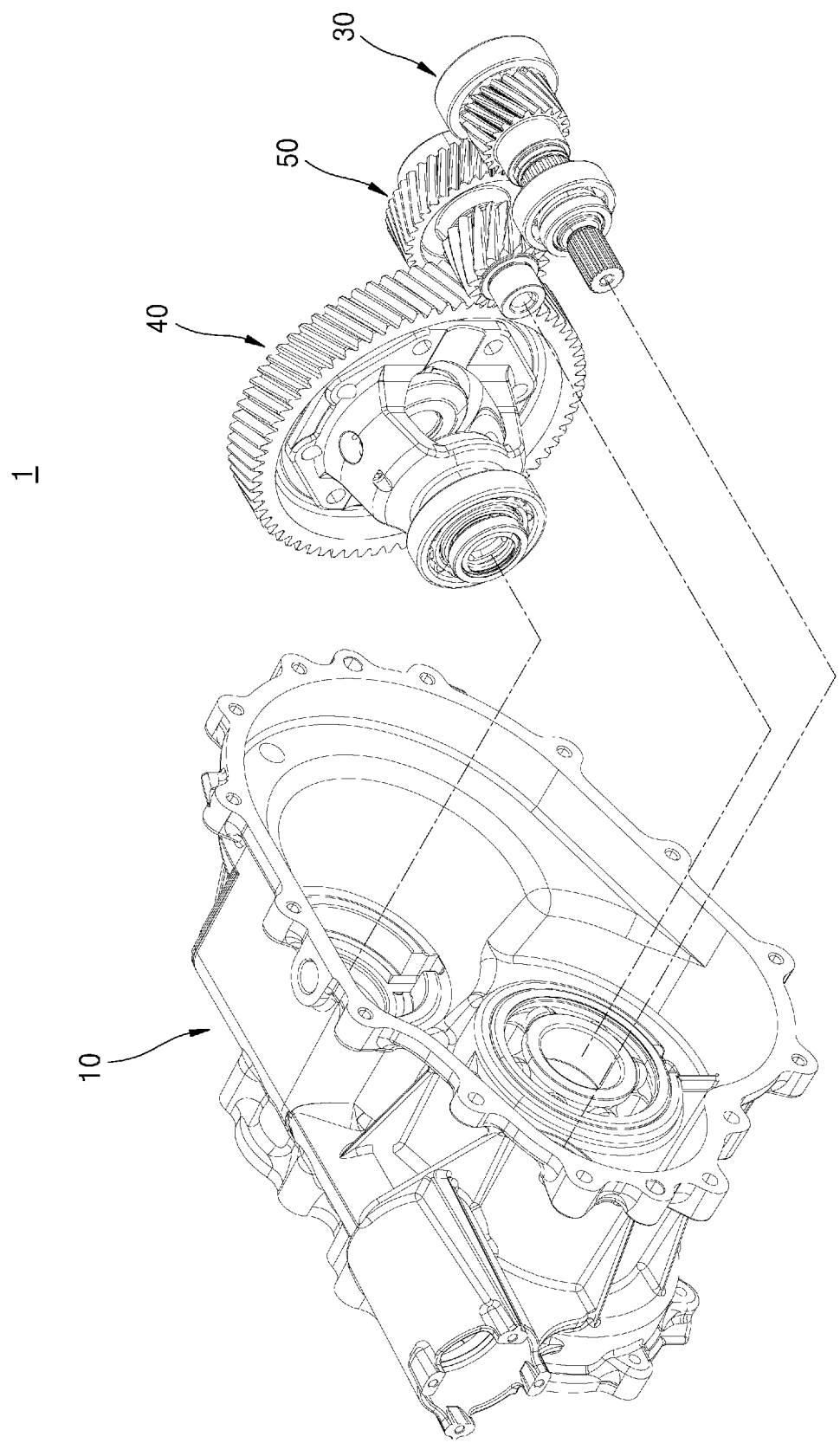
FIG. 1 is an exploded view of a transmission according to an embodiment.

Various modifications may be applied to the present embodiments, and particular embodiments will be illustrated in the drawings and described in the detailed description section. However, this is not intended to limit the disclosure to particular embodiments, and it is to be appreciated that all changes, equivalents, and substitutes that do not depart from the spirit and technical scope of the disclosure are encompassed in the disclosure. In the description of the disclosure, although illustrated in other embodiments, the same components are indicated by the same reference numerals.

Hereinafter, embodiments will be described, in detail, with reference to the accompanying drawings, and in the description with reference to the drawings, the same or corresponding components are indicated by the same reference numerals and redundant descriptions thereof are omitted.

In the following embodiment, it will be understood that although the terms "first," "second," etc. may be used herein to describe various components, these components should not be limited by these terms. These terms are only used to distinguish one component from another.

In the following embodiment, the singular forms "a," "an," and "the" are intended to include the plural forms as well, unless the context clearly indicates otherwise.

In the following embodiment, it will be further understood that the terms "comprises" and/or "comprising" used herein specify the presence of stated features or components, but do not preclude the presence or addition of one or more other features or components.

Sizes of components in the drawings may be exaggerated for convenience of explanation. In other words, since sizes and thicknesses of components in the drawings are arbitrarily illustrated for convenience of explanation, the following embodiments are not limited thereto.

In the following embodiment, the x-axis, the y-axis, and the z-axis are not limited to three axes of the rectangular coordinate system, and may be interpreted in a broader sense. For example, the x-axis, the y-axis, and the z-axis may be perpendicular to one another, or may represent different directions that are not perpendicular to one another.

When a certain embodiment may be implemented differently, a specific process order may be performed differently from the described order. For example, two consecutively described processes may be performed substantially at the same time or performed in an order opposite to the described order.

The terms used in the present specification are merely used to describe particular embodiments, and are not intended to limit the disclosure. Also, it will be understood that the terms "including," "having," and "comprising" used herein are intended to indicate the existence of features, numbers, steps, operations, components, and parts, described in the specification, or combinations thereof, and are not intended to preclude the possibility that one or more other features, numbers, steps, operations, components, and parts, or combinations thereof may exist or may be added.

Figure 2:
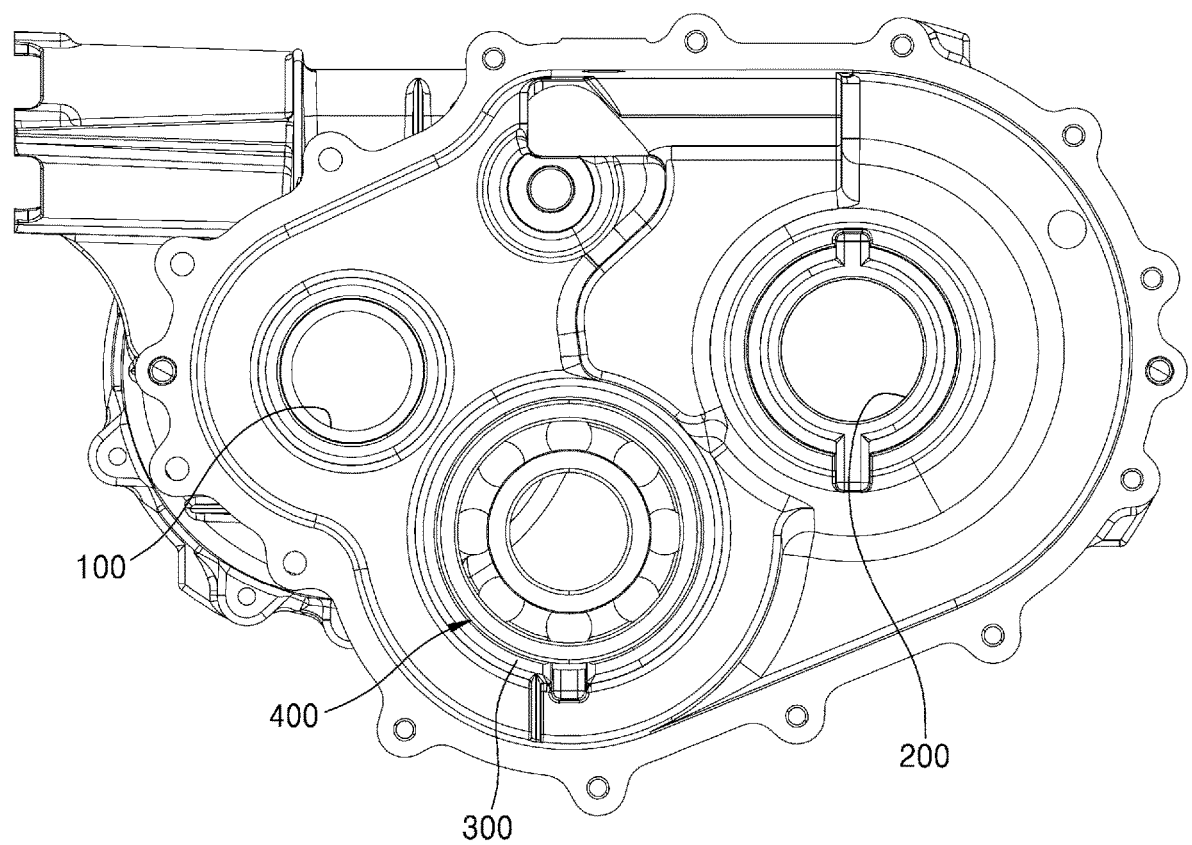
FIG. 2 shows one surface of a case according to an embodiment.
Figure 3:
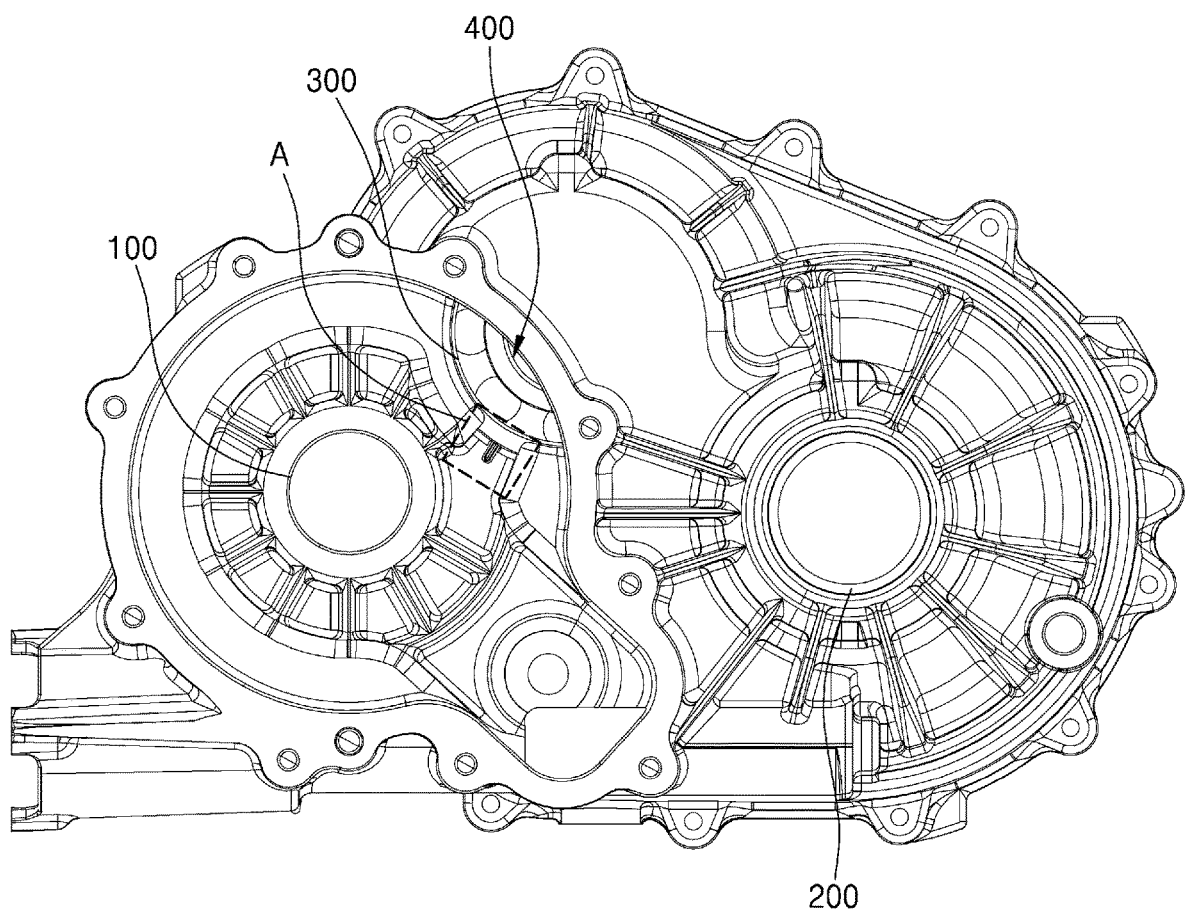
FIG. 3 shows another surface of the case according to an embodiment.
Figure 4:
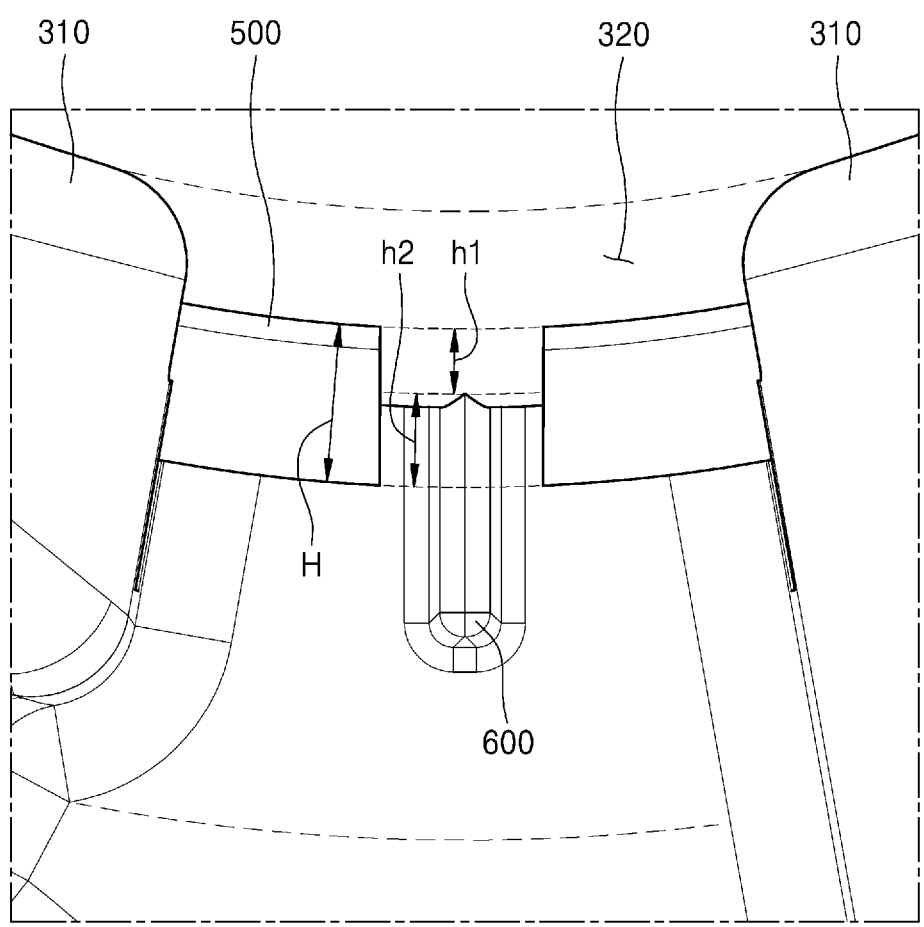
FIG. 4 is an enlarged plan view of A of FIG. 3.
Figure 5:
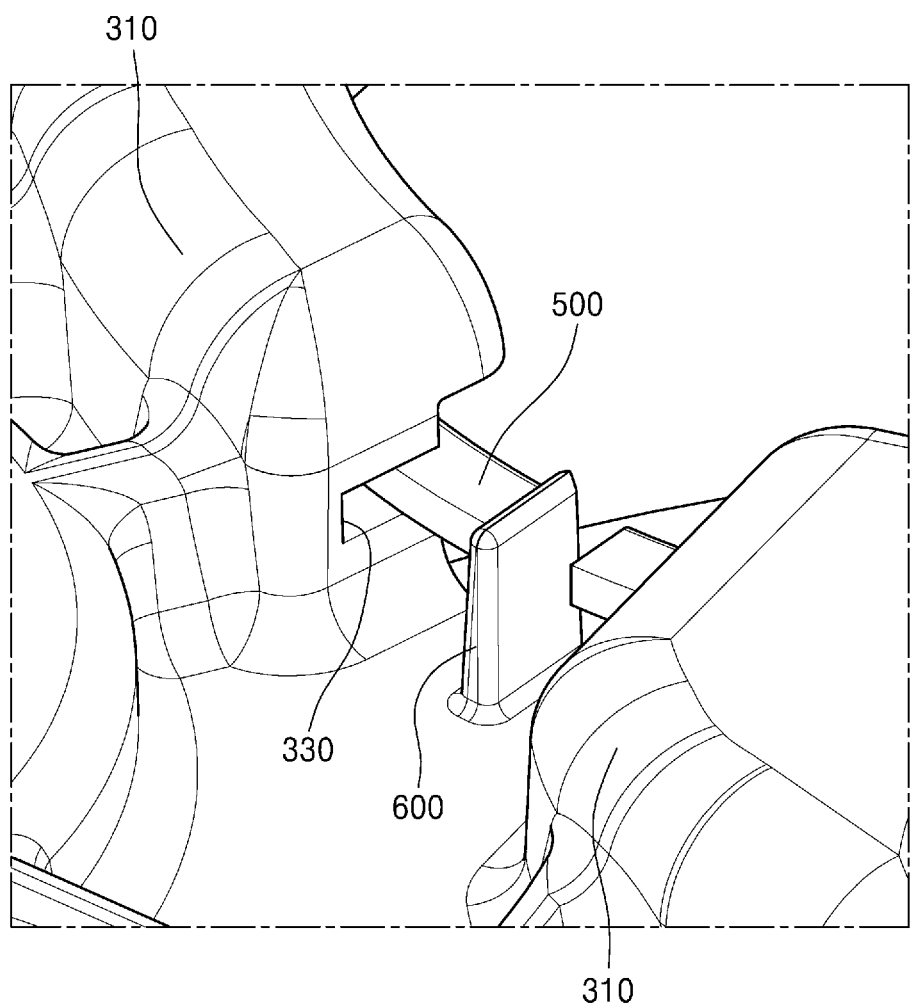
FIG. 5 is an enlarged perspective view of A of FIG. 3.
Figure 6:
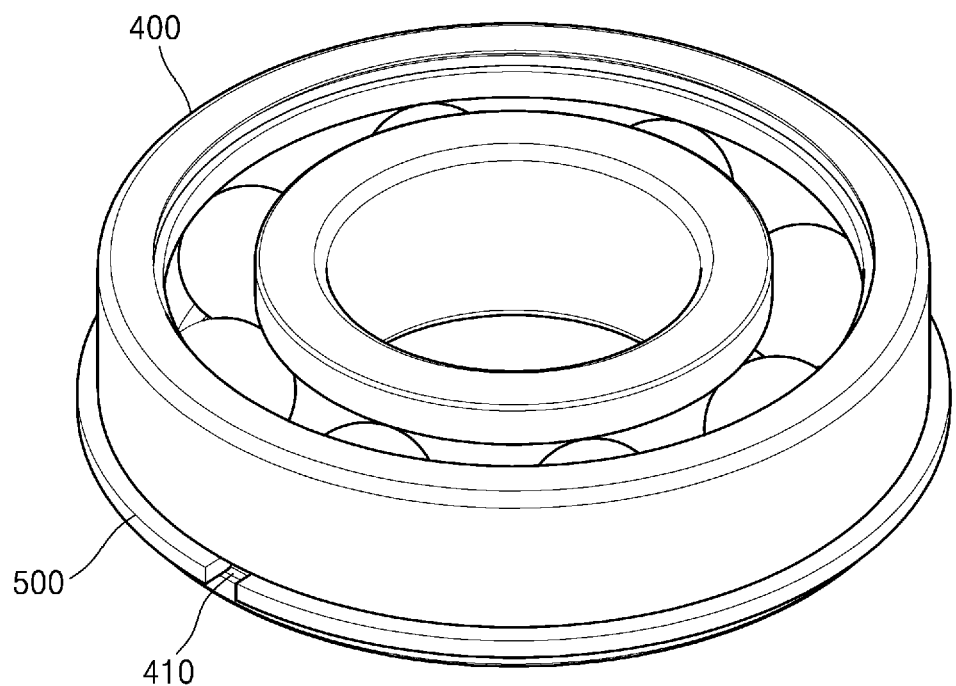
FIG. 6 shows a support bearing and a snap ring, according to an embodiment.

FIG. 1 is an exploded view of a transmission 1 according to an embodiment, FIG. 2 shows one surface of a case 10 according to an embodiment, FIG. 3 shows another surface of the case 10 according to an embodiment, FIG. 4 is an enlarged plan view of A of FIG. 3, FIG. 5 is an enlarged perspective view of A of FIG. 3, and FIG. 6 shows a support bearing 400 and a snap ring 500, according to an embodiment.

As shown in FIGS. 1 to 6, the transmission 1 according to an embodiment may include the case 10, a first driver 30, a second driver 40, and a third driver 50.

The first driver 30 may include an input shaft which receives power from the outside. The first driver 30 may be inserted into a first insertion hole 100 of the case 10.

The second driver 40 may include an output shaft which transmits power to the outside. The second driver 40 may be arranged apart from the first driver 30 and may optionally be driven in connection with the first driver 30.

The third driver 50 may be arranged between the first driver 30 and the second driver 40.

Which driver among the first driver 30, the second driver 40, and the third driver 50 is an input shaft and an output shaft and which is inserted into a third insertion hole 300 having a structure preventing snap ring rotation is not particularly limited. Hereinafter, for the convenience of description, a case where the third driver 50 is inserted into the third insertion hole 300 is mainly described.

The case 10 is where the first driver 30, the second driver 40, and the third driver 50 are mounted, and accommodates, maintains, and support the first driver 30, the second driver 40, and the third driver 50. In the drawings, only the case 10 into which the first driver 30, the second driver 40, and the third driver 50 are inserted is shown, but a cover arranged on the opposite side of the case 10 and accommodating the first driver 30, the second driver 40 and the third driver 50 together with the case 10 may be arranged. To this end, the case 10 may include a flange for coupling along an edge thereof and may be coupled with the cover via the flange. Hereinafter, for convenience of description, only the case 10 is shown.

As shown in FIGS. 1 to 3, the case 10 includes the first insertion hole 100, a second insertion hole 200, and the third insertion hole 300 into which the first driver 30, the second driver 40, and the third driver 50 are inserted, respectively.

The first insertion hole 100, the second insertion hole 200, and the third insertion hole 300 may be formed through the case 10 and may be arranged apart from each other. The first driver 30 may be inserted into the first insertion hole 100, the second driver 40 may be inserted into the second insertion hole 200, and the third driver 50 may be inserted into the third insertion hole 300. The first driver 30, the second driver 40, and the third driver 50 may be axially rotated while being inserted into the respective insertion holes.

In an embodiment, the third insertion hole 300 may include a rib 310 and an open area 320 on one surface thereof.

In more detail, as shown in FIGS. 3 and 4, the third insertion hole 300 may include, on a surface opposite to a surface into which the support bearing 400 is inserted, the rib 310 protruding along a circumference of the third insertion hole 300. The rib 310 may protrude along at least a portion of the circumference of the third insertion hole 300, and the open area 320 may be arranged in a portion where the rib 310 is not formed, that is, a portion where both ends of the rib 310 are apart from each other.

For example, as shown in FIG. 4, the open area 320 may be a closed area defined by an imaginary line extending from both ends and along an inner circumference of the rib 310 and an imaginary line extending along an outer circumference of the rib 310 when viewed from above. Herein, the imaginary line extending along the inner circumference of the rib 310 and the imaginary line extending along the outer circumference of the rib 310 may have the same curvature.

In an embodiment, the support bearing 400 coupled to an end portion of the third driver 50 may be inserted into the third insertion hole 300. The support bearing 400 may be coupled to one end of the third driver 50 to reduce rotational friction of the third driver 50 and support loads in a radial direction and an axial direction.

In an embodiment, as shown in FIGS. 2 and 6, the support bearing 400 may be a ball bearing including an outer member and an inner member forming concentric circles and a plurality of balls arranged between the outer member and the inner member. However, the type of the support bearing 400 is not particularly limited, and may be selected from among various members capable of supporting a rotational operation of the third driver 50.

In an embodiment, the snap ring 500 may be arranged inside the third insertion hole 300 to surround at least a portion of an outer surface of the support bearing 400. The snap ring 500 supports the third driver 50 and the support bearing 400 so that the third driver 50 and the support bearing 400 do not deviate from their designated positions while rotating during the operation of the transmission 1.

In an embodiment, as shown in FIGS. 4 to 6, the snap ring 500 may be a ring-shaped member having both ends arranged apart from each other. Also, the snap ring 500 may be inserted into the third insertion hole 300 while being in contact with an outer circumferential surface of the support bearing 400.

In an embodiment, the third insertion hole 300 may include a first insertion groove 330 arranged in an inner circumferential surface thereof and into which the snap ring 500 is inserted. The snap ring 500 may support the third driver 50 and the support bearing 400 without deviating from a designated position by being inserted into the first insertion groove 330.

In an embodiment, the support bearing 400 may include a second insertion groove 410 arranged in an outer circumferential surface thereof and into which the snap ring 500 is inserted. In more detail, as shown in FIG. 6, the second insertion groove 410 is a groove formed along the outer circumferential surface of the support bearing 400, and may have a shape corresponding to the snap ring 500. The snap ring 500 may support the third driver 50 and the support bearing 400 without deviating from a designated position by being inserted into the second insertion groove 410.

In an embodiment, the case 10 may include a stopper 600.

As shown in FIGS. 3 to 5, the stopper 600 is arranged on the periphery of the third insertion hole 300 and protrudes by a certain height to prevent the snap ring 500 from deviating from a designated position.

In more detail, the stopper 600 may be arranged on one side of the third insertion hole 300 and arranged to be inserted between both ends of the snap ring 500. Accordingly, even when displacement occurs in the snap ring 500 as the second driver 40 and the support bearing 400 rotate during the operation of the transmission 1, both ends of the snap ring 500 may be caught by the stopper 600, thereby preventing the snap ring 500 from deviating from a designated position. In other words, rotation of the snap ring 500 itself may be prevented via the stopper 600.

In an embodiment, the stopper 600 may be arranged in the open area 320. For example, as shown in FIGS. 4 and 5, the rib 310 protrudes around the third insertion hole 300, and the rib 310 is not arranged in some areas, and thus, the open area 320 communicating with the third insertion hole 300 may be formed. Also, the stopper 600 may be arranged inside the open area 320. Accordingly, both ends of the snap ring 500 may maintain positions while being arranged on both sides of the stopper 600, respectively, and a user may easily separate the snap ring 500 via the open area 320.

In an embodiment, both ends of the snap ring 500 may be arranged apart from both surfaces of the stopper 600 by a certain distance, and may be arranged in the open area 320. In other words, a thickness of the stopper 600 may be smaller than a distance between both ends of the snap ring 500. Also, the distance between both ends of the snap ring 500 may be smaller than a width between ribs 310, in other words, a width of the open area 320.

Accordingly, while the snap ring 500 is initially inserted into the third insertion hole 300, both ends of the snap ring 500 may be arranged apart from both surfaces of the stopper 600. In addition, as the transmission 1 operates, a gap in which the snap ring 500 may rotate within a certain angular range may be allowed, and the stopper 600 may prevent the snap ring 500 from deviating from a designated position by a certain distance or more.

In an embodiment, a height of the stopper 600 may be greater than a height of an upper end of the first insertion groove 330. Accordingly, even when the snap ring 500 is slightly oscillated in a longitudinal direction while being inserted into the first insertion groove 330, positions of both ends of the snap ring 500 may be reliably maintained by the stopper 600.

In an embodiment, an inner end portion of the stopper 600 may be arranged closer to an outer circumference of the snap ring 500 than to an inner circumference of the snap ring 500. For example, as shown in FIG. 4, when viewed from above, a width that is a distance between the inner circumference and the outer circumference of the snap ring 500 may be H. Also, a distance between the inner end portion of the stopper 600, that is, an end portion portion in a direction toward the third insertion hole 300, and the inner circumference of the snap ring 500 may be h1, and a distance between the inner end portion of the stopper 600 and the outer circumference of the snap ring 500 may be h2. In addition, h2 may be greater than h1. In other words, a distance between the inner end portion of the stopper 600 and the inner circumference of the snap ring 500 may be less than a distance between the inner end portion of the stopper 600 and the outer circumference of the snap ring 500. For example, h1 may be less than half of H.

Via such a configuration, when viewed from above, the stopper 600 may secure a wider area on the closed area defined by both ends of the snap ring 500 and the outer circumference and inner circumference of the snap ring 500. Therefore, when the snap ring 500 rotates, a wider area of contact between the snap ring 500 and the stopper 600 may be secured, and thus, displacement of the snap ring 500 may be more reliably prevented.

In an embodiment, the stopper 600 may be arranged inside the open area 320. In more detail, as shown in FIG. 4, when viewed from above, the open area 320 may be defined as an area defined by the imaginary lines extending from both ends of the rib 310 and along the inner circumference and outer circumference of the rib 310. In addition, the stopper 600 may be completely included inside the open area 320. In other words, both ends of the stopper 600 may be arranged inside the open area 320.

Via such a configuration, while displacement of the snap ring 500 is minimized, the size of the stopper 600 may be reduced, thereby reducing costs and processing required to fix the position of the snap ring 500 and facilitate disassembly.

In the drawings, the stopper 600 is shown to be a polyhedron with rounded corners or rectangular parallelepiped protruding from one surface of the case 10, but the shape thereof is not particularly limited.

In the drawings, a structure preventing rotation of the snap ring 500, which includes the stopper 600, is shown to be arranged only in the third insertion hole 300, but the disclosure is not limited thereto. For example, the structure preventing rotation of the snap ring 500 according to an embodiment may also be arranged in the first insertion hole 100 and/or the second insertion hole 200. In the transmission 1, the structure preventing rotation of the snap ring 500 according to an embodiment may be arranged in any position in which a rotational force is input and output and a rotation member such as a bearing and a snap ring is provided.

Figure 7:
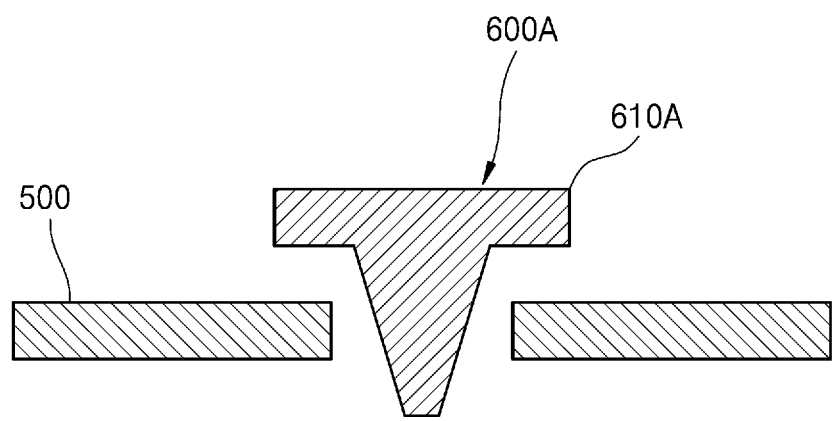
FIG. 7 shows a stopper according to some embodiments.

FIG. 7 shows a stopper 600A according to some embodiments.

In some embodiments, as shown in FIG. 7, the stopper 600A may have a shape inclined downward in a height direction. In other words, the stopper 600A may have a shape in which both side surfaces thereof facing both ends of the snap ring 500 are inclined inwardly downward. Accordingly, when the snap ring 500 rotates and an end portion thereof is in contact with both side surfaces of the stopper 600A, the end portion of the snap ring 500 naturally moves downward while being in contact with the side surface of the stopper 600A. Therefore, even when a strong rotational force is applied to the snap ring 500, the snap ring 500 may be prevented from bouncing beyond an upper end of the stopper 600A while colliding with the stopper 600A, and deviating from a designated position.

In some embodiments, as shown in FIG. 7, the stopper 600A may further include a locking protrusion 610A on an upper portion thereof. Accordingly, when both ends of the snap ring 500 bounce beyond the upper end of the stopper 600A while being in contact with the stopper 600A, the locking protrusion 610A may be in contact with both ends of the snap ring 500, thereby more reliably preventing the snap ring 500 from deviating from a designated position.

The transmission 1 according to an embodiment may include a structure preventing rotation of the snap ring 500, thereby preventing the snap ring 500 from deviating from a designated position due to a rotational force or the like occurring during the operation of the transmission 1, and easily disassembling the snap ring 500 from the case 10.

The transmission 1 according to an embodiment may include the stopper 600 arranged between both ends of the snap ring 500, thereby even with a simple configuration, reliably maintaining the position of the snap ring 500.

The transmission 1 according to an embodiment may include the open area 320 and the stopper 600 arranged inside the open area 320, thereby minimizing costs and processing required to maintain the position of the snap ring 500.

The transmission 1 according to an embodiment may include a first insertion groove 330 and the second insertion groove 410 in the third insertion hole 300 and the support bearing 400, respectively, thereby more reliably maintaining the position of the snap ring 500.

The transmission 1 according to an embodiment may have the inner end portion of the stopper 600 arranged closer to the inner circumference of the snap ring 500 than to the outer circumference of the snap ring 500, thereby allowing both ends of the snap ring 500 to be more reliably supported by the stopper 600.

The transmission 1 according to an embodiment may allow the stopper 600 to be arranged only inside the open area 320, thereby minimizing the size of the structure preventing rotation of the snap ring 500, which includes the stopper 600.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

Particular technical content described in the embodiments is illustrative examples of the disclosure and is not intended to limit the scope of the disclosure. In order to concisely and clearly describe the disclosure, descriptions of general techniques and configurations of the related art may be omitted. Furthermore, the connecting lines or connectors shown in the drawings presented are intended to represent exemplary functional relationships and/or physical or logical couplings between the various components. It should be noted that many alternative or additional functional relationships, physical connections or logical connections may be present in a practical device. Moreover, no item or component is essential to the practice of the disclosure unless the component is specifically described as "essential" or "critical."

The use of the terms "a" and "an" and "the" and similar referents described in the detailed description section and the following claims are to be construed to cover both the singular and the plural, unless otherwise indicated. Furthermore, recitation of ranges of values herein are merely intended to serve as a shorthand method of referring individually to each separate value falling within the range, unless otherwise indicated herein, and each separate value is incorporated into the specification as if it were individually recited herein. Also, the steps of all methods described herein can be performed in any suitable order unless otherwise indicated herein or otherwise clearly contradicted by context. The disclosure is not limited to the described order of the steps. The use of any and all examples, or exemplary language (e.g., "such as") provided herein, is intended merely to better illuminate the disclosure and does not pose a limitation on the scope of the disclosure unless otherwise claimed. Also, numerous modifications and adaptations will be readily apparent to those of ordinary skill in the art without departing from the spirit and scope of the disclosure.

DESCRIPTION OF REFERENCE NUMERALS

1: transmission
10: case
30: first driver
40: second driver
50: third driver
100: first insertion hole
200: second insertion hole
300: third insertion hole
400: support bearing
500: snap ring
600: stopper

What is claimed is:

1. A transmission having a structure preventing snap ring rotation, the transmission comprising:
   a first driver comprising an input shaft configured to receive power from outside;
   a second driver arranged apart from the first driver, optionally connected to the first driver, and comprising an output shaft configured to output power;

a third driver arranged between the first driver and the second driver and having one end to which a support bearing is coupled; and a case comprising a first insertion hole into which the first driver is inserted, a second insertion hole into which the second driver is inserted, a third insertion hole into which the third driver is inserted and having a snap ring arranged therein to surround at least a portion of an outer surface of the support bearing, and a stopper formed between and in correspondence with both ends of the snap ring, wherein both sides of the stopper facing the both ends of the snap ring are tapered downward, and wherein the stopper comprises a locking protrusion above the snap ring, and at least a portion of the locking protrusion overlaps the snap ring in a thickness direction of the snap ring, wherein the third insertion hole comprises a first insertion groove arranged in an inner circumferential surface thereof and into which the snap ring is inserted, and the support bearing comprises a second insertion groove arranged in an outer circumferential surface thereof and into which the snap ring is inserted.

2. A transmission having a structure preventing snap ring rotation, the transmission comprising:

a first driver comprising an input shaft configured to receive power from outside;

a second driver arranged apart from the first driver, optionally connected to the first driver, and comprising an output shaft configured to output power;

a third driver arranged between the first driver and the second driver and having one end to which a support bearing is coupled; and a case comprising a first insertion hole into which the first driver is inserted, a second insertion hole into which the second driver is inserted, a third insertion hole into which the third driver is inserted and having a snap ring arranged therein to surround at least a portion of an outer surface of the support bearing, and a stopper formed between and in correspondence with both ends of the snap ring, wherein both sides of the stopper facing the both ends of the snap ring are tapered downward, and wherein the stopper comprises a locking protrusion above the snap ring, and at least a portion of the locking protrusion overlaps the snap ring in a thickness direction of the snap ring, wherein the third insertion hole comprises a rib protruding along at least a portion of a circumference thereof and an open area in which the rib is not formed, and the stopper is arranged in the open area, and wherein the stopper has an inner end portion thereof arranged closer to an outer circumference of the snap ring than to an inner circumference of the snap ring.

3. The transmission of claim 2, wherein the both ends of the snap ring are arranged apart from both surfaces of the stopper by a certain distance in the open area.

4. The transmission of claim 2, wherein the stopper is arranged only inside the open area.

* * * * *